April 21, 1964   R. E. WEDGE   3,129,914
ALTERNATING CURRENT GENERATOR MOUNTING
Filed July 10, 1962
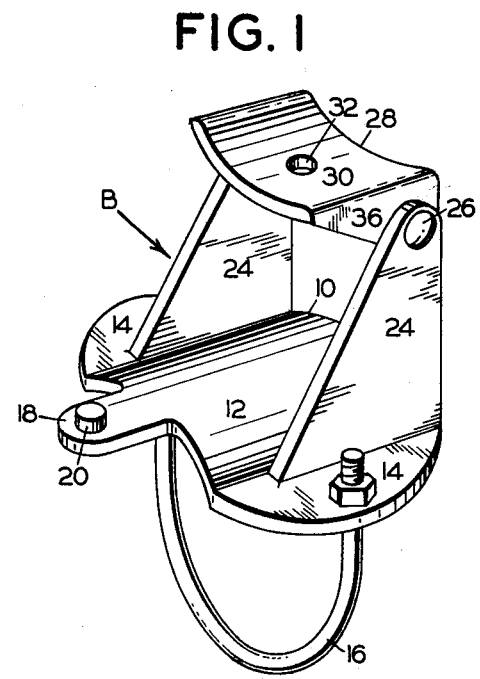
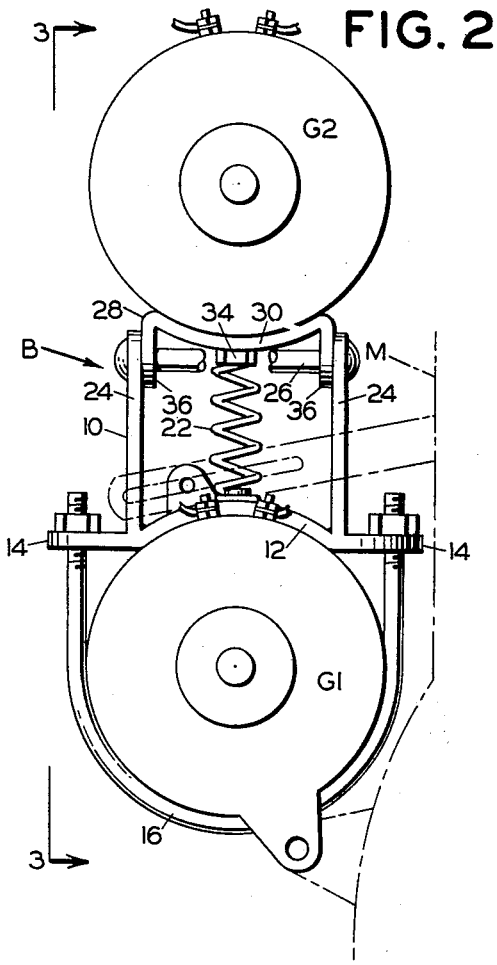
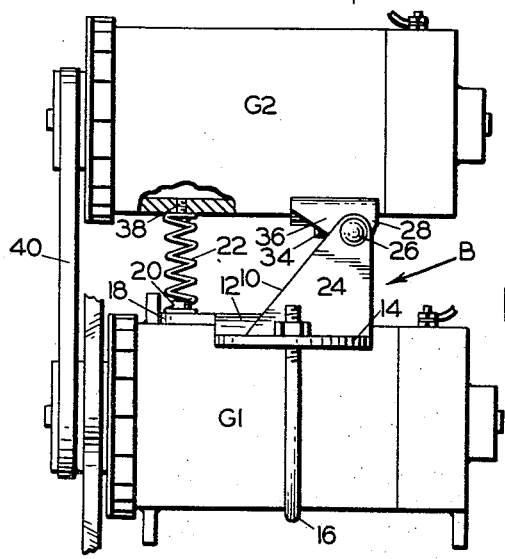
*INVENTOR.*
RAYMOND E. WEDGE
*BY*

United States Patent Office 3,129,914
Patented Apr. 21, 1964

3,129,914
ALTERNATING CURRENT GENERATOR
MOUNTING
Raymond Edwin Wedge, 3101 SE. 157th Ave.,
Portland, Oreg.
Filed July 10, 1962, Ser. No. 208,720
5 Claims. (Cl. 248—16)

This invention relates to a bracket device for supporting an alternating current generator upon the standard direct current generator used on an automobile or truck.

This bracket not only permanently fastens the alternating current generator to the vehicle but through a novel hinge and spring arrangement permits the driving belt to be removed when the vehicle is in operation. The spring exerts a constant pressure on the belt and as belt expands with age and wear the lost distance is taken up by spring tension.

FIGURE 1 is a perspective view of a mounting bracket embodying the invention;

FIGURE 2 is a front view showing the use of the bracket for mounting an alternating current generator on top of a conventional automobile direct current generator; and FIGURE 3 is a side view of the assemblage taken on the line 3—3 of FIGURE 2.

The present bracket device which is designated generally at B has a lower part 10 with an upwardly convex saddle plate 12 adapted to fit the curvature of a conventional cylindrical automobile generator such as the generator G1 on the motor M in FIGURE 2. Extending outwardly from opposite sides of the saddle plate 12 are apertured wing portions 14 carrying a U-bolt 16 which is adapted to pass around the under side of generator G1. Extending from one end of saddle plate 12 is a tongue 18 carrying a spring seat lug 20. Projecting upwardly from the wing portions 14 are a pair of ears 24 having apertures for a transverse through bolt 26 at the opposite end of the saddle plate. The parts 12, 14, 18 and 24 are preferably made as an integral iron casting.

The bracket B also has an upper part 28 with a downwardly convex saddle plate 30 which is centrally apertured at 32. A screw or bolt 34 passes through aperture 32 to secure the auxiliary alternating current generator G2 to the saddle plate. Downwardly projecting ears 36 on opposite sides of the saddle plate are apertured for pivotal support on the bolt 26.

Saddle plate 12 is mounted on generator G1 with its tongue 18 projecting toward the pulley end of the generator, as shown in FIGURE 3, and the auxiliary generator G2 is secured in a similar position to its saddle plate 30. A compression coil spring 22 tends to lift the pulley end of generator G2 about its pivotal axis 26. The lower end of this spring is centered and seated on lug 20 and the upper end is similarly centered and seated on a spring seat lug 38 on the lower side of the housing of generator G2. A belt 40 is placed on pulleys on corresponding ends of the generators by compressing the spring. Thus, the spring maintains a constant pressure on the belt, eliminating slippage and expanding as the belt becomes worn. To avoid wear on the auxiliary generator when it is not in use, the belt can be removed by depressing the auxiliary generator and sliding the belt off.

Having now described my invention and in what manner the same may be used, what I claim as new and desire to protect by Letters Patent is:

1. A device for mounting an auxiliary generator on an automobile generator comprising a transversely curved saddle plate adapted to seat on one side of the automobile generator, a transverse U-bolt adjustably connected at its ends with said saddle plate and arranged to encircle the opposite side of the automobile generator, a pair of upstanding ears on opposite sides of said saddle plate, a transversely curved saddle plate for the auxiliary generator, means for securing the auxiliary generator to said last saddle plate, a pair of downturned ears on opposite sides of said last saddle plate, and transverse pivot means interconnecting said two pairs of ears for supporting the auxiliary generator approximately parallel with the automobile generator.

2. A device for mounting an auxiliary generator on an automobile generator comprising an upwardly and transversely curved saddle plate having apertured outstanding wing portions on its opposite sides, a transverse U-bolt having its ends disposed in said apertures, a central tongue extending from one end of said saddle plate, a spring seat lug on said tongue, a pair of upstanding apertured ears on said wing portions, an apertured downwardly and transversely curved saddle plate having apertured downturned ears on its opposite sides, and a transverse through bolt in the apertures of both sets of said ears pivotally interconnecting the two saddle plates.

3. A bracket adapted to seat on an automobile generator, means for securing said bracket to the generator, an auxiliary generator, a bracket secured to said auxiliary generator, a transverse pivotal connection between said two brackets arranged to support the auxiliary generator approximately parallel with the automobile generator, aligned and confronting spring seat lugs on said first bracket and auxiliary generator at a distance lengthwise of the generators from said pivotal connection, and a compression spring having its opposite ends centered on said lugs.

4. A saddle plate adapted to seat on one side of an automobile generator, apertured wing portions extending from opposite sides of said saddle plate, a transverse U-bolt adapted to encircle the opposite side of said generator and having its ends disposed in said apertures for clamping the saddle plate to the generator, a central tongue extending from one end of said saddle plate, a spring seat lug on said tongue, a pair of upstanding ears on said wing portions having apertures toward the opposite end of said saddle plate, an auxiliary generator, an apertured saddle plate for said auxiliary generator, a screw through said aperture securing said auxiliary generator to said last saddle plate, downturned apertured ears on opposite sides of said last saddle plate, a transverse through bolt extending through both sets of said apertured ears for pivotally connecting said saddle plates to support the auxiliary generator approximately parallel with the automobile generator, a spring seat lug on said auxiliary generator aligned with and confronting said spring seat lug on said tongue, and a compression spring having its opposite ends centered on said lugs.

5. A saddle plate adapted to seat on an automobile generator, means for clamping the saddle plate to the generator, a pair of apertured upstanding ears on said saddle plate, an auxiliary generator, a saddle plate for said auxiliary generator, means for securing said auxiliary generator to said last saddle plate, downturned apertured ears on said last saddle plate, pivot means extending through both sets of said apertured ears for pivotally connecting said saddle plates to support the auxiliary generator approximately parallel with the automobile generator, and spring means arranged to urge the auxiliary generator away from the automobile generator.

References Cited in the file of this patent
UNITED STATES PATENTS

| | | |
|---|---|---|
| 2,235,972 | Zimmerman | Mar. 25, 1941 |
| 2,709,931 | Bunnell | June 7, 1955 |
| 2,856,785 | Steele | Oct. 21, 1958 |